United States Patent [19]

Ardrey, Jr.

[11] Patent Number: 5,398,711
[45] Date of Patent: Mar. 21, 1995

[54] MODULAR FLUID CHARACTERISTIC SENSOR AND ADDITIVE CONTROLLER

[75] Inventor: William E. Ardrey, Jr., Broken Arrow, Okla.

[73] Assignee: Pulsafeeder, Inc., Muskogee, Okla.

[21] Appl. No.: 261,292

[22] Filed: Jun. 16, 1994

Related U.S. Application Data

[63] Continuation of Ser. No. 5,652, Jan. 19, 1993, abandoned.

[51] Int. Cl.$^6$ .................................................. G05D 21/02
[52] U.S. Cl. ........................................ 137/5; 137/93; 137/343
[58] Field of Search ................... 137/5, 93, 343; 220/4.02, 344

[56] References Cited

U.S. PATENT DOCUMENTS

| | | | |
|---|---|---|---|
| 3,680,070 | 7/1972 | Nystuen | 137/5 |
| 3,765,436 | 10/1973 | Dziomba | 137/93 X |
| 4,172,880 | 10/1979 | Tzavos | 137/5 X |
| 4,460,008 | 7/1984 | O'Leary | |
| 4,466,072 | 8/1984 | Kaufmann | 137/93 X |
| 4,471,898 | 9/1984 | Parker | 220/4.02 X |
| 4,571,092 | 2/1986 | Switall | 137/93 X |
| 4,800,238 | 1/1989 | Gesvent | 220/344 X |
| 4,884,715 | 12/1989 | Pohlmann | 220/4.02 X |

*Primary Examiner*—Stephen M. Hepperle
*Attorney, Agent, or Firm*—Hill, Steadman & Simpson

[57] ABSTRACT

A modular control is provided for sensing characteristics of a fluid and controlling the dispensing of additives into said fluid. The control is contained in a box-like housing having an openable wall which is sealable to a remainder of said housing in a water-tight manner. A plurality of printed circuit boards can be mounted in an interior of said housing. A control circuit is carried on at least one printed circuit board mounted in the housing including a microprocessor controller. At least one probe is provided for immersion in the fluid to detect a characteristic of the fluid. At least one output device is provided for dispensing an additive into the fluid. A signal processing circuit is carried on a printed circuit board mounted in the housing for processing a signal received from the probe. An output control circuit is carried on a printed circuit board mounted in the housing for controlling the output device. A display is mounted on one of the housing walls. An input device for inputting data and control commands is mounted on one of the housing walls. A user can select particular probes, signal conditioning boards, output control boards and output devices to sense one or more characteristics of the fluid and control additive dispensers and other output devices to control the sensed characteristics.

18 Claims, 5 Drawing Sheets

MODULAR FLUID CHARACTERISTIC SENSOR AND ADDITIVE CONTROLLER

This is a continuation of application Ser. No. 08/005,652, filed Jan. 19, 1993, now abandoned.

BACKGROUND OF THE INVENTION

The present invention relates to an apparatus and method for controlling and regulating the introduction of additives, to a fluid.

The control devices for regulating the introduction of additives to a fluid are known and are useful in environments such as controlling the quality of water, for example, in a cooling tower system. U.S. Pat. No. 4,460,008 discloses a control system and method of controlling the cycling of water in a cooling tower system.

In the past, control devices of this nature have been fairly complex and have been dedicated to a single type of control arrangement. This has resulted an expensive control apparatus which has fairly complex operating requirements and requires individualized instruction and not suitable for upgrading.

SUMMARY OF THE INVENTION

The present invention provides a modular control apparatus with a control panel suitable for receiving a variety of differing control templates to permit the single apparatus to be used in a variety of different environments and for controlling different additives.

The control is housed in a water tight control box which is provided within its interior with mounting locations for receiving a variety of differing control devices to permit a single control box unit to be used in a wide variety of differing control configurations. The control utilizes microprocessors which have connections to appropriate input sensors for detecting various conditions and characteristics of the fluid and a microprocessor controller that operates various output control devices, which may be in the form of relays, to dispense appropriate additives into the fluid to maintain the desired condition within the fluid as sensed by the sensors.

In an embodiment of the invention, the control can be used to regulate various chemicals to a system and can include a timer for dispensing appropriate chemicals over selected time periods.

The device can be used in a variety of environments such as for cooling water treatment, boiler water treatment, waste water control, process control, spas/swimming pool control and may incorporate a programmable timer.

The apparatus has a housing which is openable and which can be closed so as to be water tight and secure. The interior is dimensioned to receive different types of circuit boards including output control circuit boards having control switches for directing output signals to selected pumps and valves and other output devices, a power supply circuit board, a processor circuit board (motherboard) for processing signals and one or more input/output boards powering and receiving signals from sensors. A display panel is viewable from the exterior of the housing and is provided with input keys for allowing a user to input various data and control commands into the system and to review various control parameters.

The control unit is designed to function with a large variety of sensors or signal generators and, in general, each signal generator will have an associated input/output card (printed circuit board) received in a slot interior of the housing and plugged or electrically connected directly to the processor card. The input/output cards provide power to the sensor and receive back from the sensor the associated signal. That signal is conditioned by the card and transmitted to the processor board which is provided with an analog to digital converter and a prom or an E-prom. The signal is received and processed and imputed into the central processing unit. Depending upon the software program present in the prom or E-prom, the result may be the output of a signal to the output board which may then cause activation or deactivation of one or more switches or output generation devices which may, in turn, be coupled to pumps or valves for activation or deactivation of a chosen one or group of such devices.

The use of individual input/output cards particularly adapted to the chosen sensor allows the control to be custom modified for each installation with a minimum manufacturing differentiation. The use of a prom or E-prom driven CPU allows the entire program to be customized, modified and updated without significant assembly or on site changes being made and allows for growth or modification of the system being controlled without the necessity of replacing the controller.

DETAILED DESCRIPTION OF THE PREFERRED EMBODIMENTS

Figure 1:
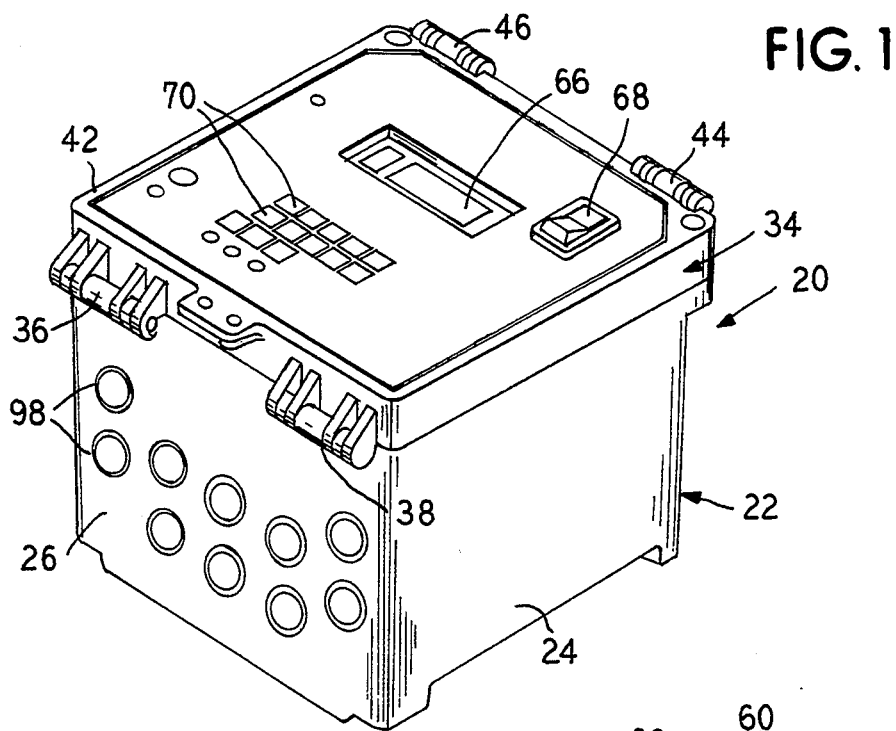
FIG. 1 is a perspective view of the control housing incorporating the principles of the present invention.
Figure 2:
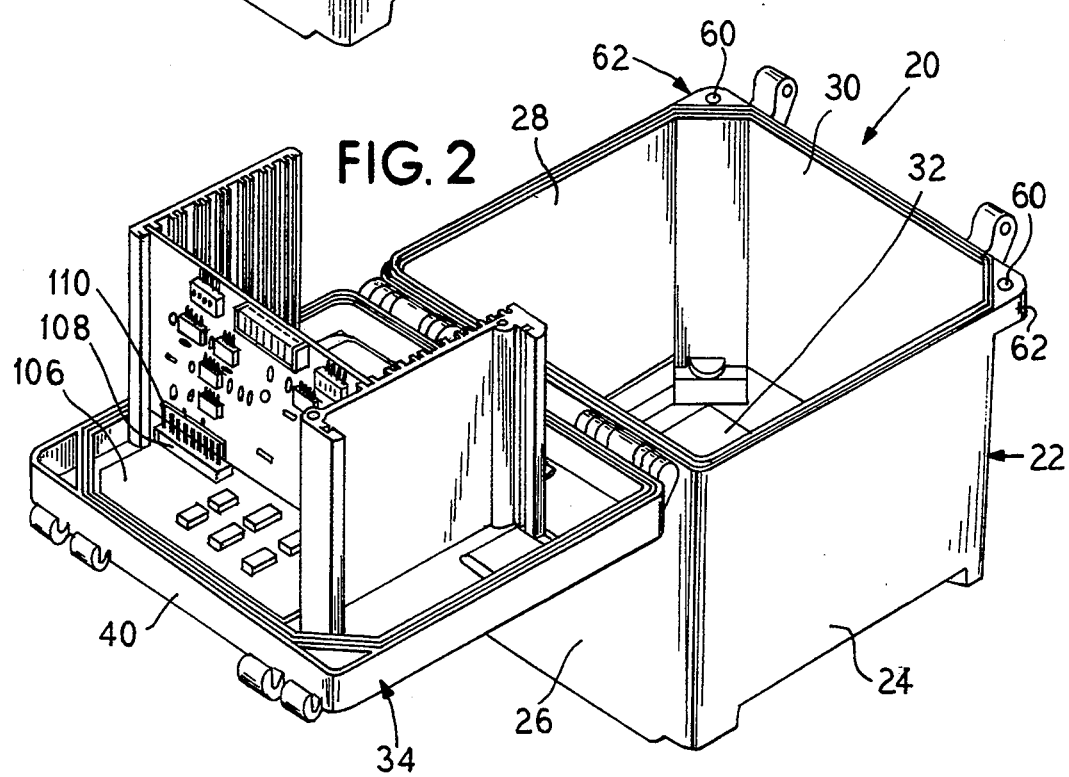
FIG. 2 is a perspective view of the control housing in an open position.
Figure 3:
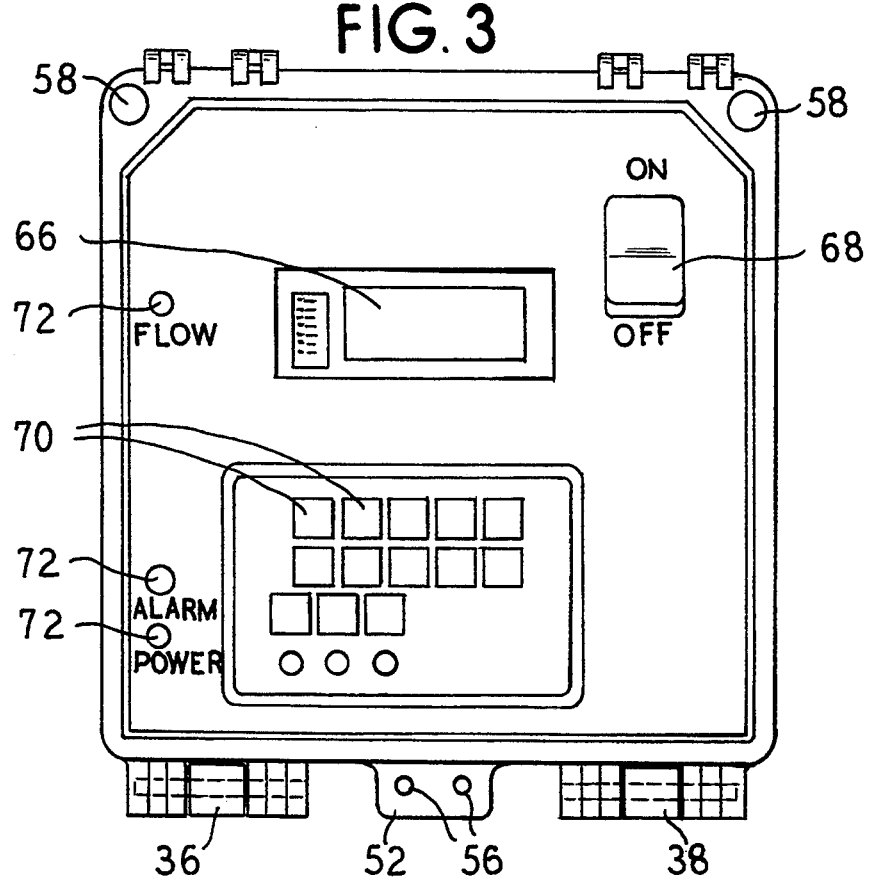
FIG. 3 is a plan view of the housing illustrating the display panel.

A modular control unit 20 is illustrated in FIGS. 1–10. The control unit 20 is contained within a box-like housing 22 having four integral sidewalls 24, 26, 28, 30 and a bottom wall 32 also formed integrally with the sidewalls. A top wall 34 is attached to the remainder of the housing 22 by a pair of hinges 36, 38 which connect the top wall 34 with sidewall 26. The top wall 34 has a peripheral vertical flange 40 which provides a stop for the pivoting motion of the top wall 34 when the top wall is moved to a full open position as illustrated in FIG. 2. Thus, the top wall is pivotable through an angle of 180°. A protective cover 42 is pivotally attached by hinges 44, 46 to the top wall 34.

Figure 9:
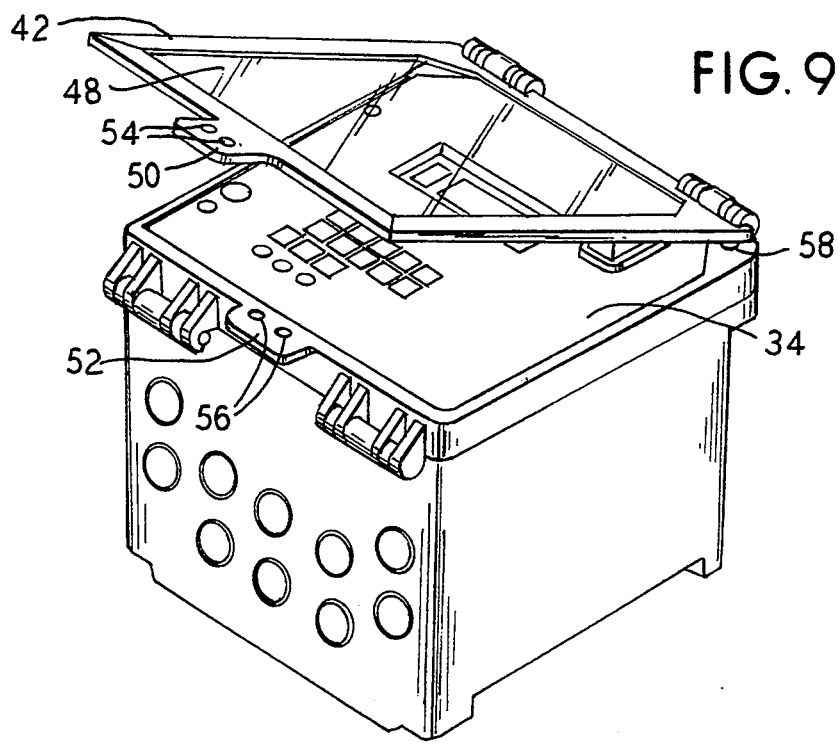
FIG. 9 is a perspective view showing the protective control panel cover in a partially opened position.

As best seen in FIG. 9, the cover 42 can be pivoted to an open position providing access to a template 47 secured to the exterior of the top wall 34. A central window 48 of the cover 42 is transparent to permit viewing of the template 47 even when the cover 42 is pivoted downwardly onto the top of the top wall 34. A variety of different templates 47 can be utilized, depending upon the particular circuitry chosen to installed within the housing. A tab 50 on the cover 42 overlies a tab 52 on the top wall 34. Each of the tabs 50, 52 is provided with a pair of openings 54, 56 which also overlie one another so that an appropriate locking device can be attached to the tabs to maintain the top of the template 47 in an accessible condition for unauthorized personnel.

The top wall 34 can be locked onto the remainder of the housing 22 by appropriate fastening devices, such as threaded fasteners, being inserted through openings 58 (FIGS. 3 and 9) in the top wall 34 and received in openings 60 in two corner ledge areas 62 of the housing 22. The fasteners extending through the top wall 34 are inaccessible until the cover 42 has been fully opened. Thus, the interior of the housing 22 can be protected from unauthorized personnel as well.

The template 47 and the top wall 34 contain a display 66, a control switch 68 and a plurality of input keys 70. The display, which may be an LED or LCD type display, provides a user with information relating to the condition of the control unit 20. The control switch 68 can be used to turn the control unit 20 on and off. The input keys 70 can be used to input data or control commands to the control unit.

The control switch 66 and the input keys 70 are maintained inaccessible by the cover 42. Since the central window 48 of the cover is transparent, the display 66 is visible even when the cover is in a closed and locked condition.

Other visual displays 72, which may be in the form of LED's, may be provided on the top surface of the top wall 34 in certain configurations of the control unit to provide indication of such things as powering of the unit, an alarm condition or a flow condition.

A top edge of the housing 22 and a bottom edge of the top wall 34 are provided with an interfitting contour and seal such that when the top wall is pivoted down onto the housing 22, and locked in place by the fasteners, the interior of the housing 22 will be maintained in a water-tight condition.

Figure 4:
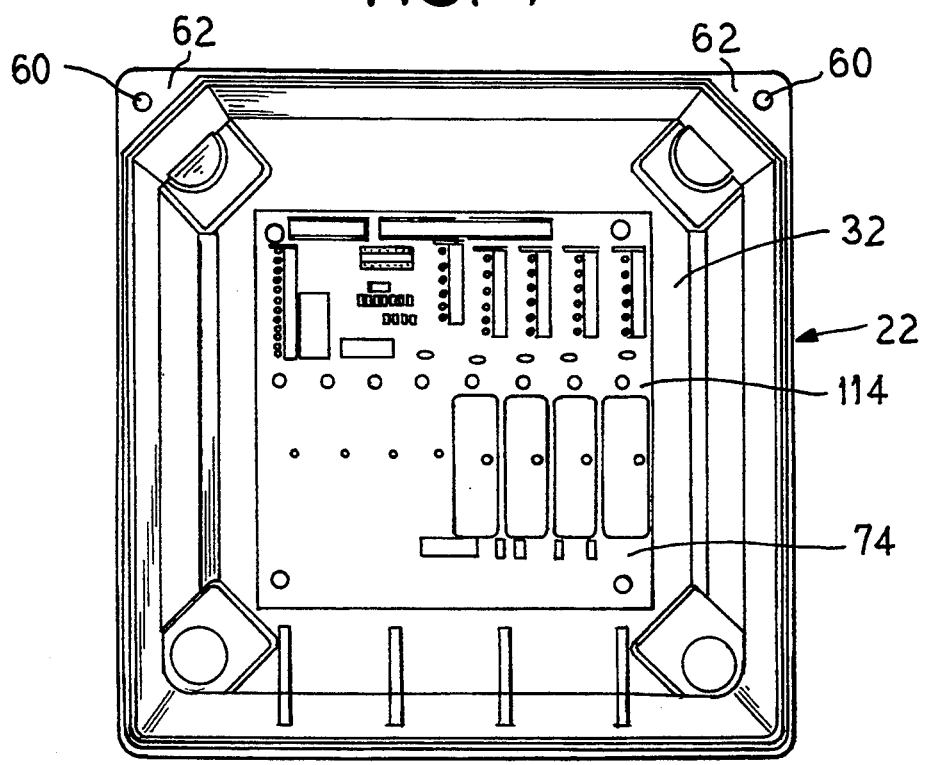
FIG. 4 is a plan view of the control housing with the lid removed for clarity.
Figure 5:
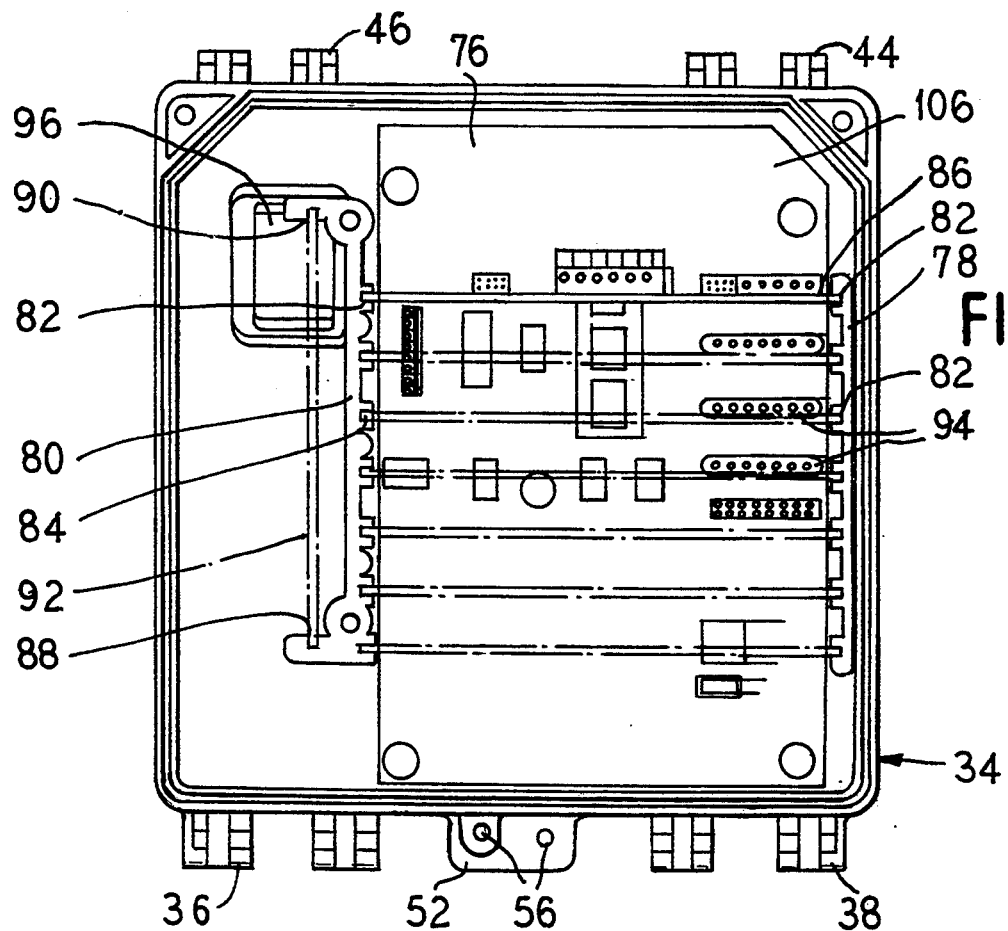
FIG. 5 is a bottom view of the lid of the housing.
Figure 6:
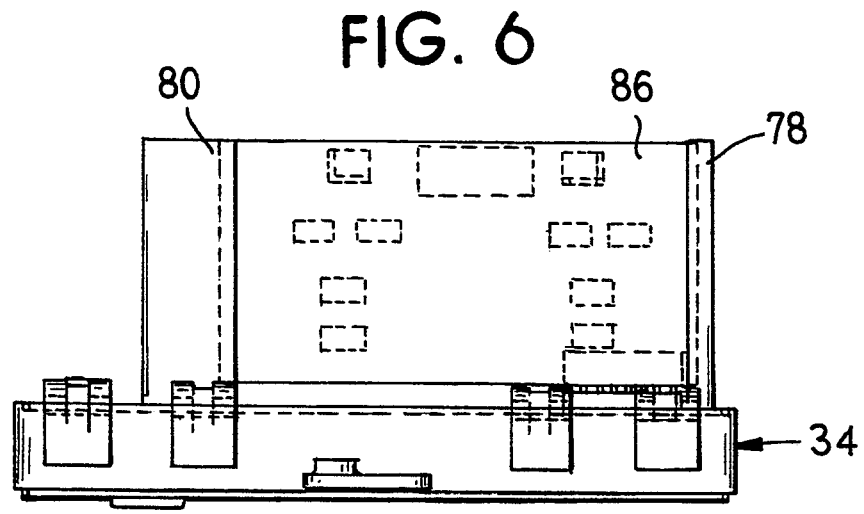
FIG. 6 is a side elevational view of the lid of FIG. 5.
Figure 7:
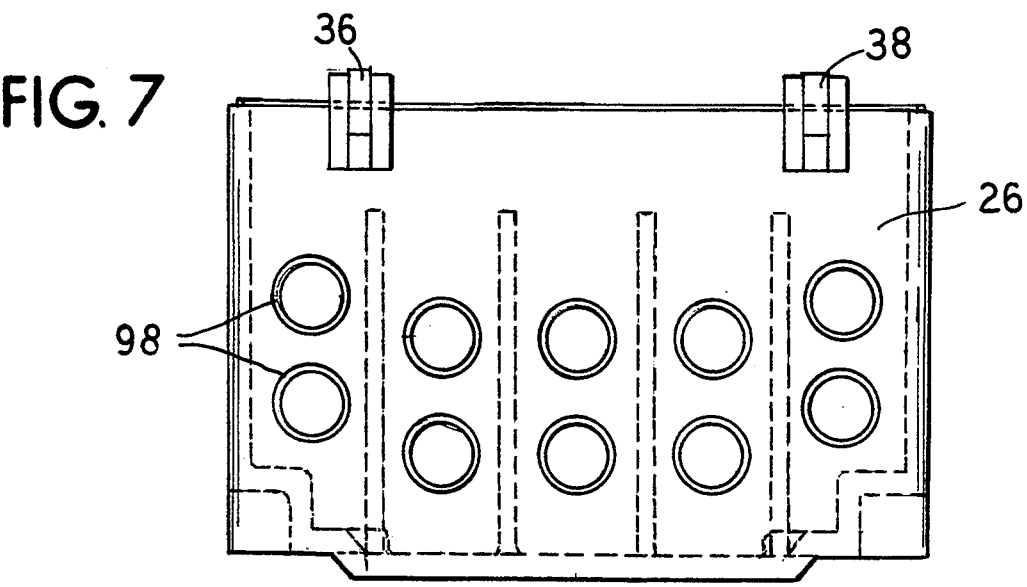
FIG. 7 is a rear elevational view of the housing.
Figure 8:
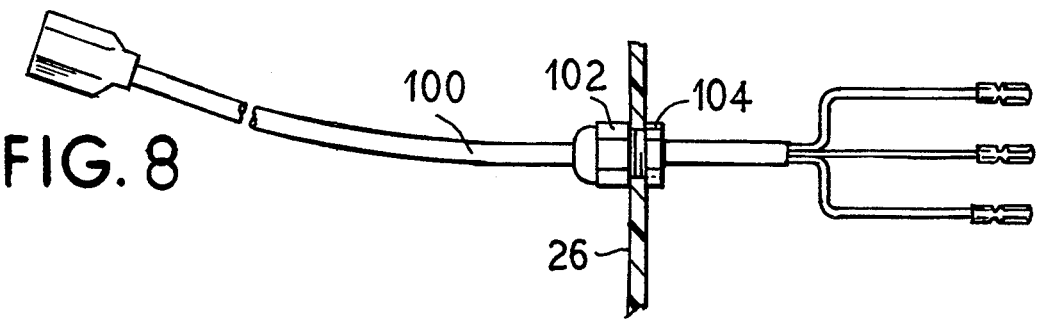
FIG. 8 is a partial sectional view of the rear wall of the housing and illustrating a wire connection through the wall of the housing.

The interior of the housing 22 is illustrated in FIG. 4. Secured to the bottom wall 32 is a printed circuit board 74. The interior of the top wall 34 is shown in FIGS. 5 and 6 where it is seen that the top wall also has a printed circuit board 76 mounted parallel to the top wall 34. A pair of parallel walls 78, 80 extend perpendicularly downwardly from the top wall 34 and include a plurality of guides 82, 84 for receiving and mounting additional printed circuit boards 86; The wall 80 also contains another pair of opposed guides 88, 90 for receiving and mounting still another printed circuit board 92.

The guides 82, 88, 90 are positioned such relative to various components and terminals 94, 96 on the printed circuit board 76 mounted to the top wall 34, to permit connector elements contained on circuit boards 86, 92 to be directly plugged into the components and terminals 94, 96 carried on the circuit board 76. Thus, a minimal amount of wiring is required to interconnect the circuitry of circuit boards 76, 86 and 92. Some wiring, of course, is required to connect the circuitry of those circuit boards with circuit board 74 mounted to the bottom wall 32.

At least one of the walls, such as wall 26, may be provided with one or more punch outs 98 to permit the interconnection of various external components to the control circuitry contained within the housing 22. The punch outs provide access to the interior of the housing 22 and allow for passage of an appropriate number of electrical cords 100 (FIG. 8) or electrical conduit pipes which are necessary to connect the control circuitry within the housing 22 to exterior sensors and output control devices such as relays, pumps, motors, etc. The electrical cords 100 are provided with sealing connectors 102, 104 which have threaded interconnections permitting the cord 100 to have a water tight seal with the wall 26. Thus, even if the control housing is placed in an environment which is subject to contact with corrosive or conductive fluids, the housing and interconnection of the cords will prevent entry of any such fluids into the interior of the housing.

Figure 10:
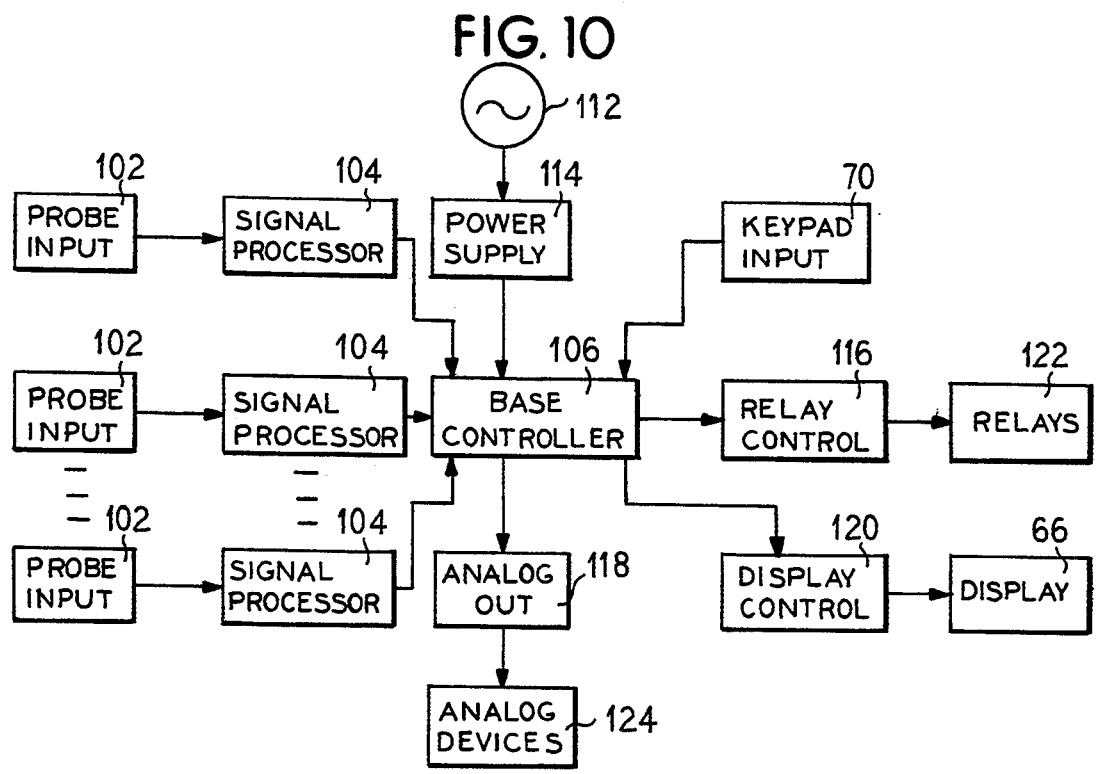
FIG. 10 is a block diagram schematic of the control circuitry for the present invention.

FIG. 10 illustrates, in block diagram form, the control circuitry for the controller.

A plurality of probe sensors are indicated at 102. These probes can be selected, as desired, for sensing particular characteristics of the fluid, such as conductivity, pH, oxidation reduction potential, etc. The probe inputs would be connected by means of conduit wiring or a cord, such as cord 100, to the interior of the housing where a signal processor circuit board 104 is positioned. The signal processor circuit board would be selected to specifically interface with the particular type of probe sensor utilized. The signal processor circuit boards preferably are connected directly to a base controller or motherboard circuit board 106 which may be the circuit board secured directly to the top wall 34 of the housing 22. The signal processor circuit board 104 would then be one of the circuit boards illustrated in FIG. 5 which are mounted perpendicular to the motherboard circuit board 106 and both the motherboard circuit board and the signal processor circuit board have connection devices 108, 110 which permit the circuit boards to be directly plugged to one another to reduce the need for any extra wiring.

A source of alternating current 112 is connected, again by means of electrical conduit or a power cord, such as cord 100, to a power supply circuit 114 which may be one of the circuit boards secured perpendicular to the motherboard 106 of the housing 22. Appropriate circuitry connections, such as direct connection plugs, may be used to connect the power supply circuit board 114 to the motherboard base controller circuit board 106.

As described previously, the top wall 34 is provided with a plurality of input keys, which may be in the form of a keypad which also has direct connection to the motherboard base controller circuit board 106.

The motherboard base controller supplies output signals to output control circuit boards which may be in the form of a relay control 116, an analog output 118 as well as a display control circuit 120. The relay control circuit may send appropriate signals, through output cables or electrical conduit to devices such as relays 122 to control the flow of various selected additives to the fluid being sensed. The analog output from circuit 118 can be directed through an output cord to various types of analog devices including motors, pumps, etc to vary the speed and operation of such devices.

The display control circuit 120 will provide appropriate signals to the display 66 mounted in the top wall 34.

The base controller circuit board 106 may include a prom or E-prom circuit component which can be programmable for the particular configuration of input devices and output devices to be used with the control circuit. Thus, each circuit can be individually customized and selected input and output circuit boards can be selected and assembled into the housing 22 in a modular fashion to greatly simplify the manufacturing process. Modification of the control, once manufactured, can also easily be accomplished by changing the prom or E-prom and changing the number or type of input and output devices.

The base controller may also contain a timer such that various of the output devices could be controlled to operate periodically based upon input from the timer being supplied to the control program.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A modular control for sensing characteristics of a fluid and controlling the dispensing of additives into said fluid comprising:
   a box-like housing having six walls, at least one of which is completely pivotally openable and yet sealable to a remainder of said housing in a water-tight manner;
   mounting means for a plurality of printed circuit boards positioned in an interior of said housing including mounting means for at least one circuit board on said openable wall;
   a control circuit carried on at least one printed circuit board mounted in said housing including a microprocessor controller;
   at least one probe for immersion in said fluid to detect a characteristic of said fluid;
   at least one output device for dispensing an additive into said fluid;
   a signal processing circuit carried on a printed circuit board mounted in said housing for processing a signal received from said probe;
   circuit means for connecting said signal processing circuit to said control circuit;
   an output control circuit carried on a printed circuit board mounted in said housing for controlling said output device;
   circuit means for connecting said control circuit to said output control circuit and for connecting said output control circuit to said output device;
   display means mounted on one of said housing walls;
   circuit means for connecting said display controller to said display means;
   input means for inputting data and control commands mounted on one of said housing walls;
   circuit means for connecting said input means to said control circuit; and
   circuit means for providing electrical power to said control circuit.

2. A modular control according to claim 1, wherein a plurality of probes are connected to said control and an equal number of signal processing circuits are mounted in said housing for connection to said probes.

3. A modular control according to claim 1, wherein said mounting means comprise slots formed in walls interior of said housing to guide and hold said printed circuit boards in selected positions.

4. A modular control according to claim 1, wherein said control circuit includes a preprogrammed prom.

5. A modular control according to claim 1, wherein said control circuit includes a preprogrammed E-prom.

6. A modular control according to claim 1, including a protective cover plate pivotally secured to said housing to cover said input means.

7. A modular control according to claim 6, including means associated with said cover plate and said housing for accommodating locking of said cover plate to prevent unauthorized access to said input means.

8. A modular control according to claim 6, wherein said openable wall includes means for locking said wall closed on said housing and said cover plate covers said locking means when pivoted closed on said housing.

9. A modular control according to claim 1, wherein said probe is used to detect the pH of said fluid.

10. A modular control according to claim 1, wherein said probe is used to detect a conductivity of said fluid.

11. A modular control according to claim 1, wherein said probe is used to detect an oxidation reduction potential of said fluid.

12. A modular control according to claim 1, wherein said output device comprises a relay.

13. A modular control according to claim 1, wherein said output device comprises an analog device.

14. A modular control for receiving signals from one or more probes representative of sensed characteristics of a fluid and controlling one or more output devices for the dispensing of additives into said fluid comprising:
   a box-like housing having a completely pivotally openable wall which is sealable to a remainder of said housing in a water-tight manner;
   mounting means for a plurality of circuit boards positioned in an interior of said housing including mounting means for at least one circuit board on said openable wall;
   a control circuit carried on a circuit board mounted in said housing;
   a plurality of different signal processing circuits carried on separate circuit boards, and also separate from said control circuit board, each individually selectively mounted in said housing for processing a signal received from a probe;
   said mounting means arranged so as to cause at least one component on said signal processing circuit board to connect directly to at least one component on said control circuit board;
   a plurality of different output control circuits carried on separate circuit boards, each individually selectively mounted in said housing for controlling said output device;
   circuit means for connecting said control circuit to said output control circuit and for connecting said output control circuit to said output devices.

15. A modular control circuit for receiving signals from one or more probes representative of sensed characteristics of a fluid and for sending signals to control one or more output devices for the dispensing of additives into said fluid comprising:
   a motherboard circuit board including a microprocessor and a plurality of input and output connectors;
   a plurality of different signal conditioning circuit boards, each capable of receiving signals from a particular type of probe which represent certain characteristics of said fluid;

said signal conditioning circuit boards including input and output connectors engageable with particular ones of said motherboard input and output connectors to provide communication between selected ones of said signal conditioning circuit boards and said motherboard;

a plurality of different output control circuit boards, each capable of sending controlling signals to a particular type of output device for dispensing additives into said fluid;

said output control circuit boards including input and output connectors engageable with particular ones of said motherboard input and output connectors to provide communication between selected ones of said output control circuit boards and said motherboard.

16. A method of controlling one or more desired characteristics of a fluid comprising the steps:

selecting a sensor from a group of available different types of sensors for detecting said desired characteristic;

selecting a signal conditioning circuit board from a group of available different types of signal conditioning circuit boards corresponding to said characteristic;

plugging said selected signal conditioning circuit board into a motherboard having control circuit components thereon;

selecting an output control circuit board from a group of available different types of signal conditioning circuit boards for operating an output device comprising an additive dispenser;

plugging said selected output control circuit board into said motherboard;

plugging said output device into said output control circuit board;

immersing said selected sensor in said fluid;

operating said output device in response to signals received from said sensor.

17. A method of constructing a modular control device which receives signals from one or more sensors representative of sensed characteristics of a fluid and sends signals to control one or more output devices for the dispensing of additives into said fluid comprising the steps:

providing a housing for receiving a plurality of circuit boards;

providing a motherboard circuit board with a control circuit and a plurality of connector components thereon;

providing a plurality of signal conditioning boards, each for receiving a signal from a sensor which senses a different characteristic of a fluid, and each which has at least one connector component thereon;

providing a plurality of output control circuit boards, each for controlling a different type of output device, and each which has at least one connector component thereon;

securing said motherboard circuit board in said housing;

selecting at least one of said signal conditioning boards and at least one of said output control circuit boards and interconnecting their connector components with connector components on said motherboard to sense a particular characteristic of said fluid and to operate an output device in response to said sensed characteristic to dispense an additive into said fluid.

18. A modular control for the dispensing of additives into a fluid comprising:

a box-like housing having a completely pivotally openable wall which is sealable to a remainder of said housing in a water-tight manner;

mounting means for a plurality of circuit boards positioned in an interior of said housing including mounting means for at least one circuit board on said openable wall;

a control circuit carried on a circuit board mounted in said housing;

a plurality of different output control circuits carried on separate circuit boards, each individually selectively mounted in said housing for controlling an output device;

circuit means for connecting said control circuit to said output control circuit and for connecting said output control circuit to said output devices.

* * * * *